United States Patent
Yanase et al.

(10) Patent No.: US 6,569,364 B2
(45) Date of Patent: May 27, 2003

(54) METHOD FOR PRESS-MOLDING DIELECTRIC BLOCK

(75) Inventors: Wataru Yanase, Omihachiman (JP); Yukio Higuchi, Omihachiman (JP)

(73) Assignee: Murata Manufacturing Co. Ltd. (JP)

(*) Notice: Subject to any disclaimer, the term of this patent is extended or adjusted under 35 U.S.C. 154(b) by 206 days.

(21) Appl. No.: 09/873,590

(22) Filed: Jun. 4, 2001

(65) Prior Publication Data

US 2002/0004978 A1 Jan. 17, 2002

(30) Foreign Application Priority Data

Jun. 21, 2000 (JP) ........................ 2000-185997

(51) Int. Cl.[7] .................. B29C 43/04; B29C 43/42; B30B 7/04; B30B 9/28
(52) U.S. Cl. ................ 264/40.5; 264/104; 264/119; 264/319; 425/78; 425/150; 425/352; 425/414
(58) Field of Search ................ 425/352, 150, 425/78, 414; 264/104, 40.1, 40.5, 109, 119, 299, 318, 319

(56) References Cited

U.S. PATENT DOCUMENTS

| | | | | | |
|---|---|---|---|---|---|
| 2,888,715 | A | * | 6/1959 | Frank ........................... | 419/66 |
| 3,020,589 | A | * | 2/1962 | Maritano ..................... | 425/78 |
| 3,166,617 | A | * | 1/1965 | Munk .......................... | 264/109 |
| 3,694,127 | A | * | 9/1972 | Takahashi et al. ........... | 425/352 |
| 3,835,210 | A | * | 9/1974 | Kirkpatrick et al. ......... | 264/618 |
| 3,842,646 | A | * | 10/1974 | Kuhn .......................... | 72/354.8 |
| 4,012,215 | A | * | 3/1977 | Schwab et al. .............. | 65/66 |
| 4,053,267 | A | * | 10/1977 | DeSantis ..................... | 425/78 |
| 4,153,399 | A | * | 5/1979 | DeSantis ..................... | 425/78 |
| 4,270,890 | A | * | 6/1981 | Ottl ............................ | 425/150 |
| 4,573,895 | A | * | 3/1986 | DeSantis et al. ............. | 425/78 |
| 4,801,415 | A | * | 1/1989 | Hughes ....................... | 264/120 |
| 4,853,180 | A | * | 8/1989 | Howard ....................... | 419/66 |
| 5,024,811 | A | * | 6/1991 | Hinzmann et al. ........... | 419/66 |
| 5,043,111 | A | * | 8/1991 | Hinzmann et al. ........... | 264/40.5 |
| 5,049,054 | A | * | 9/1991 | Schaidl et al. ............... | 425/78 |
| 5,122,319 | A | * | 6/1992 | Watanabe et al. ........... | 264/109 |
| 5,259,744 | A | * | 11/1993 | Take ........................... | 425/78 |
| 5,326,242 | A | * | 7/1994 | Katagiri et al. .............. | 425/78 |
| 5,682,674 | A | * | 11/1997 | Yamazaki et al. | |
| 5,694,640 | A | * | 12/1997 | Greetham ..................... | 419/38 |
| 5,698,149 | A | * | 12/1997 | Hinzmann et al. ........... | 264/120 |
| 5,897,826 | A | * | 4/1999 | Lashmore et al. ........... | 264/437 |
| 6,099,772 | A | * | 8/2000 | Hinzmann et al. ........... | 264/109 |
| 6,154,951 | A | * | 12/2000 | Ito et al. | |
| 6,165,400 | A | * | 12/2000 | Hinzmann .................... | 264/120 |
| 6,241,935 | B1 | * | 6/2001 | Beane et al. ................. | 264/437 |
| 6,296,794 | B1 | * | 10/2001 | Day et al. .................... | 264/109 |
| 6,482,338 | B1 | * | 11/2002 | Levin et al. ................. | 264/40.1 |

FOREIGN PATENT DOCUMENTS

JP 55-71697 * 5/1980

* cited by examiner

*Primary Examiner*—Angela Ortiz
(74) *Attorney, Agent, or Firm*—Dickstein, Shapiro, Morin & Oshinsky, LLP.

(57) ABSTRACT

An interface F between upper mandrels and lower mandrels are moved to a predetermined position in a cavity with the upper mandrels and the lower mandrels slidingly moving toward the lower punch while the upper mandrels and the lower mandrels remain in contact with each other, in a manner such that pressure is not applied to powdered dielectric material disposed in the cavity. The powdered dielectric material in the cavity is compressed by an upper punch and the lower punch while the upper mandrels and the lower mandrels remain in contact with each other, thereby forming a dielectric block.

8 Claims, 15 Drawing Sheets

METHOD FOR PRESS-MOLDING DIELECTRIC BLOCK

BACKGROUND OF THE INVENTION

1. Field of the Invention

The present invention relates to a method for press-molding a dielectric block.

2. Description of the Related Art

A known press-molding method, disclosed in Japanese Unexamined Utility Model Application Publication No. 55-71697, will be described with reference to FIGS. 17–19B. FIG. 17 shows a die 507, an upper punch 508, and a lower punch 509. The upper punch 508 is received in the die 507 as it descends (see FIG. 18), and the lower punch 509 is positioned in the die 507. The upper punch 508 and the lower punch 509 are provided with mandrels 510 and 511, respectively, which are vertically movably inserted into the upper punch 508 and the lower punch 509, respectively, at eccentric positions with respect to each other. The mandrels 510 and 511 are urged toward each other by respective springs 512 and 513.

The above molding apparatus serves to mold a dielectric block 520 (FIGS. 19A and 19B) provided with a hole 516 in which a step 515 is formed. In the molding apparatus, the mandrel 511 of the lower punch 509 is raised to a predetermined level, as shown in FIG. 17, and the upper punch 508 descends, thereby compressing a powdered dielectric ceramic 514 while the mandrel 510 is in contact with the mandrel 511, as shown in FIG. 18. Thus, the dielectric block 520 shown in FIGS. 19A and 19B is obtained.

In order to avoid cracks in the vicinity of the step 515, the powdered dielectric ceramic 514 must be compressed in such a manner that the density of ceramic to be press-molded in regions A1, A2 and A3 (FIG. 18 are the same.

However, in the known press-molding method, the position of a contact part between the vertically opposing mandrels 510 and 511 is controlled by controlling the balance of resilient forces between the springs 512 and 513 making it difficult to accurately control the position of the interface where the mandrels 510 and 511 contact one another during the pressurizing step. Therefore, a problem occurs in that the density of ceramic in the region A2 differs from that in the regions A1 and A3 and it is likely that cracks will be produced in the vicinity of the step 515.

SUMMARY OF THE INVENTION

Accordingly, it is an object of the present invention to provide a method for press-molding a dielectric block, in which the position of contact parts between upper and lower mandrels can be accurately controlled during compression, whereby cracks are not likely to be produced in the vicinity of steps of the dielectric block.

To the end, according to an aspect of the present invention, a method for press-molding a dielectric block uses a press-molding apparatus provided with an upper mold including an upper punch provided with a slidingly movable upper mandrel, and a lower mold including a die having a cavity and a lower punch provided with a slidingly movable lower mandrel. The upper punch is slidingly movable in the cavity of the die and the lower punch is coupled in the cavity of the die. The method comprises the steps of charging a predetermined amount of a powdered dielectric material into the cavity when the lower mandrel protrudes from the lower punch into the cavity; moving at least one of the upper mold and the lower mold so as to approach and come into contact with each other with a lower face of the upper mandrel and an upper face of the lower mandrel contacting each other at an interface between them; moving the upper mandrel and the lower mandrel toward the lower punch while the upper and lower mandrels remain in contact with one another at the interface and transferring the interface to a predetermined position in the cavity charged with the powdered dielectric material; and compressing the powdered dielectric material in the cavity using relative movement between the upper punch and the lower punch while the upper mandrel and the lower mandrel remain in contact with each other at the interface, thereby forming the dielectric block.

In the method for press-molding a dielectric block according to a preferred embodiment of the present invention, the upper and lower mandrels are cylindrical in shape, r1 denotes the radius of the cylindrical lower mandrel, r2 denotes the radius of the cylindrical upper mandrel, and P denotes the distance of offset between the axis of the lower mandrel and the axis of the upper mandrel, and the expression $0 \leq P \leq r1+r2$ is satisfied.

In the above-described transferring step, the powdered dielectric material is distributed in the cavity so as not to significantly apply pressure to the powdered dielectric material in the cavity and to form a shape of the dielectric block 1 and expanded in a direction of pressurization. Then, the density of the powdered dielectric material in the cavity is made substantially even by compressing the powdered dielectric material in the cavity. Therefore, cracks are not likely to be produced in the vicinity of a step part of a hole formed in the dielectric block, such as a dielectric filter or a dielectric duplexer.

The position of the lower mold and the position of the upper mold may be independently servo-controlled. With this arrangement, the position of the contact part between the upper and lower mandrels can be accurately controlled, whereby the density of the powdered dielectric material in the cavity can be more reliably made even.

BRIEF DESCRIPTION OF THE DRAWINGS

Other features and advantages of the present invention will become apparent from the following description of the invention which refers to the accompanying drawings.

DETAILED DESCRIPTION OF EMBODIMENTS OF THE INVENTION

A method for press-molding a dielectric block, according to preferred embodiments of the present invention, is described below with reference to the attached drawings. (First Embodiment with Reference to FIGS. 1 to 7)

Figure 1:
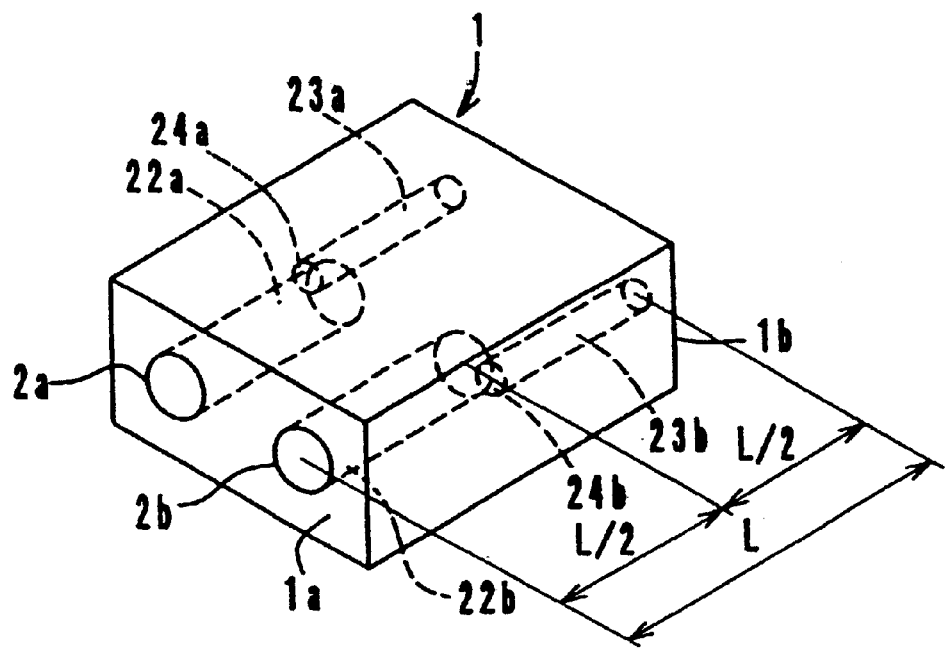
FIG. 1 is a perspective view of a dielectric block formed by a press-molding method according to a first embodiment of the present invention.
Figure 2:
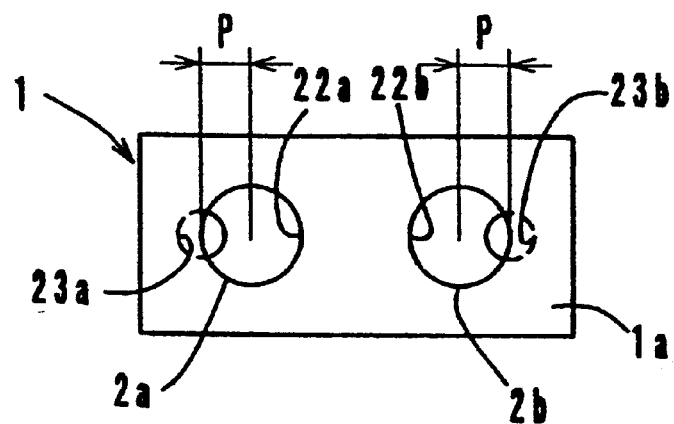
FIG. 2 is a front view of the dielectric block shown in FIG. 1.

FIGS. 1 and 2 show a dielectric block 1 which is used for a dielectric filter and which is formed by a press-molding method according to a first embodiment of the present invention. The dielectric block 1 is provided with a pair of coaxial-resonator holes 2a and 2b passing between opposite faces 1a and 1b of the dielectric block 1. The coaxial-resonator holes 2a and 2b include larger diameter portions 22a and 22b having circular sections, respectively, and smaller diameter portions 23a and 23b having circular sections, respectively.

The axes of the smaller diameter portions 23a and 23b are eccentric with respect to the larger diameter portions 22a and 22b, respectively. In the preferred embodiment, the position and diameters of the various portions of the coaxial-resonator holes 2a and 2b satisfy the expression $r1-r2 \leq P \leq r1+r2$, wherein r1 denotes the radius of each larger diameter portion 22a or 22b, r2 denotes the radius of each smaller diameter portion 23a or 23b, and P denotes the distance of offset between the axis of each larger diameter portion 22a or 22b and the axis of each smaller diameter portion 23a or 23b (see FIG. 2), respectively. The coaxial-resonator holes 2a and 2b are offset in such a manner that a cross section of each smaller diameter portion 23a or 23b is disposed partly outside the cross section of each larger diameter portion 22a or 22b in cross-sectional view. A step 24a disposed at the interface between the larger diameter portion 22a and the smaller diameter portion 23a or a step 24b disposed at the interface between the larger diameter portion 22b and the smaller diameter portion 23b is positioned at a longitudinally intermediate point (L/2) of each coaxial-resonator hole 2a or 2b having a length L.

The distance of offset P between the axis of the larger diameter portion 22a or 22b and the axis of the smaller diameter portion 23a or 23b, respectively, is preferably set so as to satisfy the expression $O \leq P \leq r1+r2$. Thus, the distance P may be zero, that is, the axis of the larger diameter portion 22a or 22b may coincide with the axis of the small diameter portion 23a or 23b.

Figure 3:
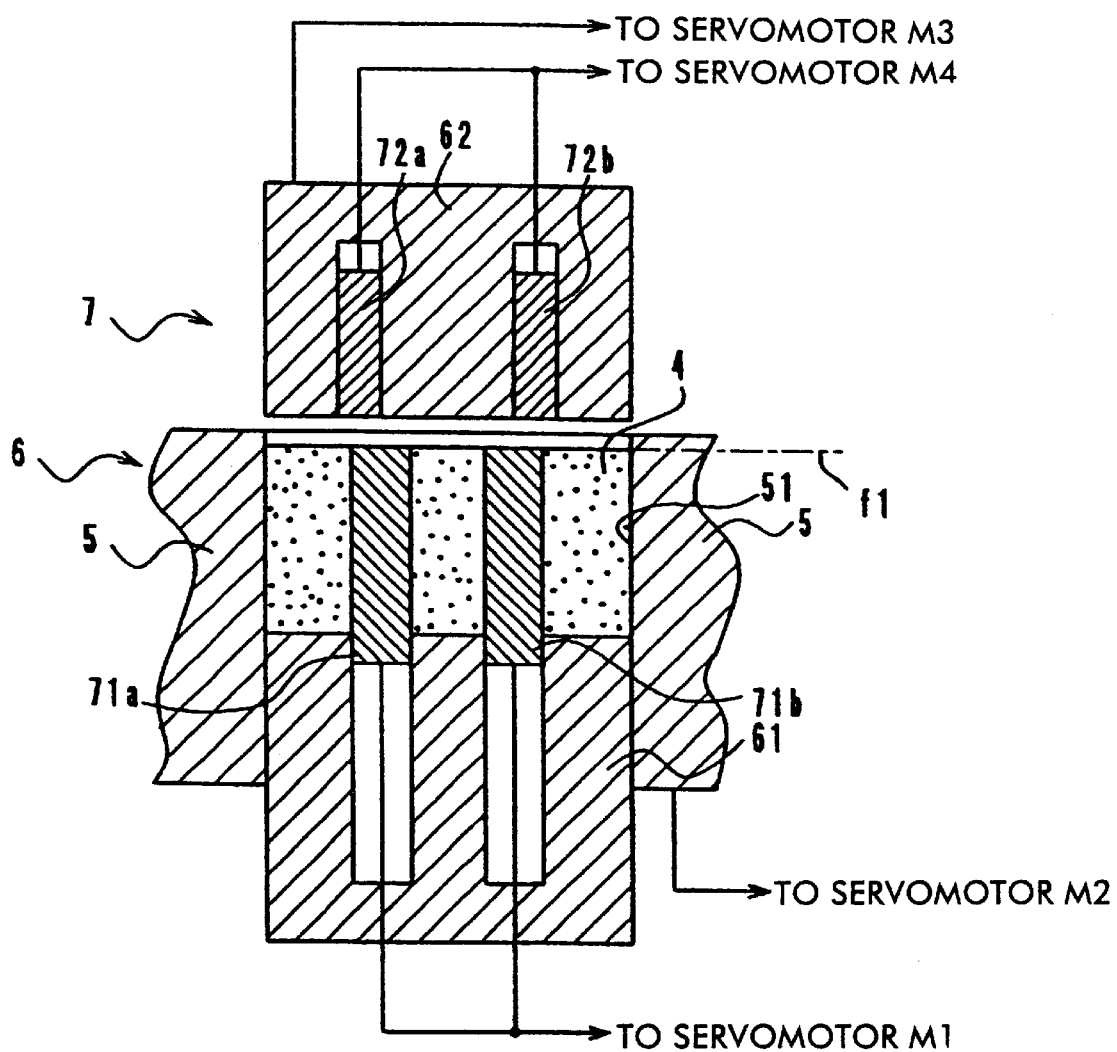
FIG. 3 is a schematic longitudinal-sectional view showing the method for press-molding the dielectric block shown in FIG. 1.

Referring now to FIG. 3, the press-molding apparatus for forming the above dielectric block 1 is provided with a lower mold 6 and an upper mold 7. The lower mold 6 includes a die 5 and a lower punch 61 which is provided with lower mandrels 71a and 71b slidingly movable relative to the lower punch 61. The die 5 is provided with a rectangular cavity 51 as viewed in longitudinal section. The lower punch 61 is located in the cavity 51. The lower mandrels 71a and 71b are cylindrical and each have radii r1. The upper mold 7 includes an upper punch 62 and upper mandrels 72a and 72b which are slidingly movable relative to the upper punch 62. The upper mandrels 72a and 72b are cylindrical and each have radii r2.

The positions of the lower mold 6 and the upper mold 7 are independently servo-controlled. AC servomotors M1, M2, M3, and M4 drive the lower mandrels 71a and 71b, the die 5, the upper punch 62, and the upper mandrels 72a and 72b, respectively, up and down in the vertical direction. The AC servomotors M1, M2, M3, and M4 are numerically controlled in accordance with positional information obtained by measuring the distances from the upper face of the lower punch 61 as a reference plane to the lower face of the upper punch 62, to the lower faces of the upper mandrels 72a and 72b, to the upper faces of the lower mandrels 71a and 71b, and to the upper face of the die 5. The difference between "actual position during operations" and "designated position" (input signal of desired values) is control and is controlled so as to be compensated for.

The method for press-molding the above-described dielectric block 1 is described below. As shown in FIG. 3, the lower mandrels 71a and 71b are raised to a level f1 and the press-molding apparatus is charged with a predetermined amount of a powdered dielectric material 4 which includes a ceramic such as a barium-titanium-type ceramic or a barium-titanium-neodymium-type ceramic (a charging step). According to the first embodiment, the powdered dielectric material 4 is charged into the cavity 51 substantially to the same level as the level f1.

Figure 4:
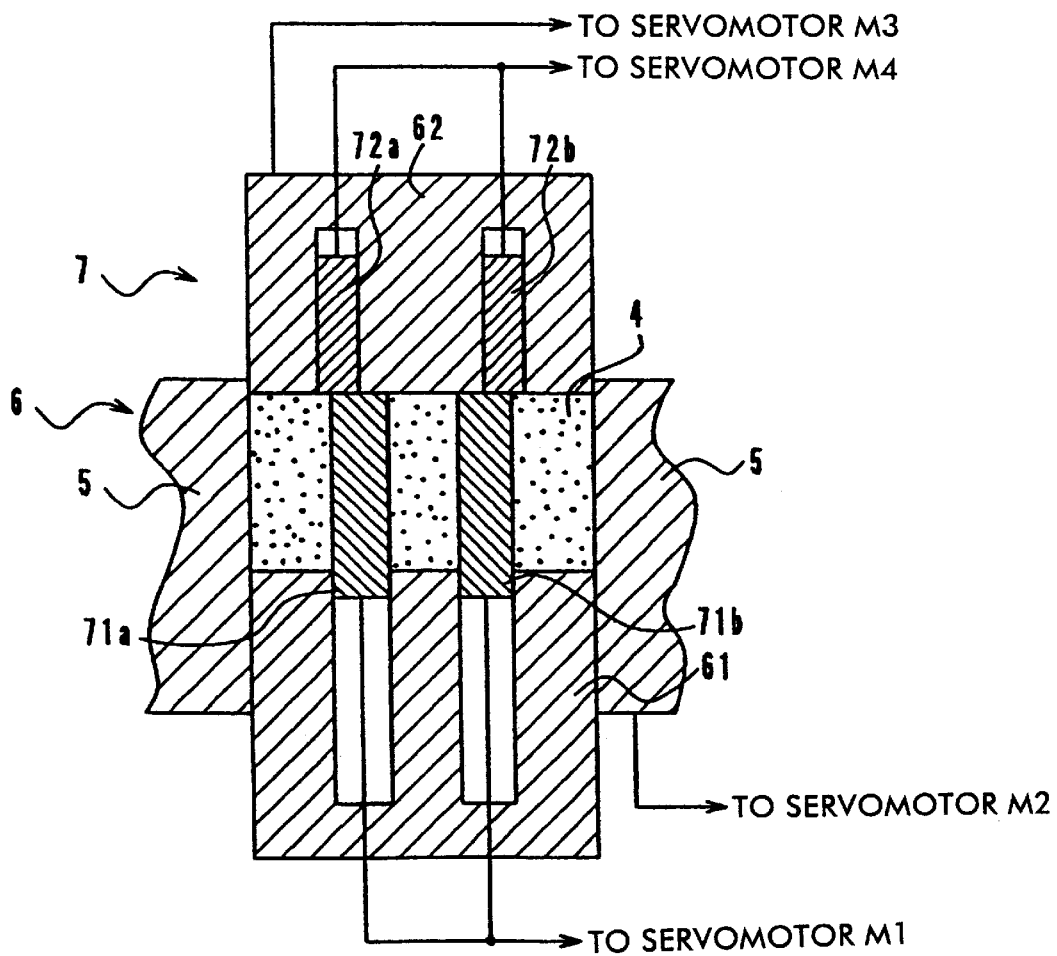
FIG. 4 is a schematic longitudinal-sectional view showing a step subsequent to that shown in FIG. 3.

The upper mold 7 descends until the lower faces of the respective upper punch 62 and the upper mandrels 72a and 72b come into contact with the upper faces of the lower mandrels 71a and 71b, and stops descending, as shown in FIG. 4 (an approaching step). The contacting faces of the upper mandrels 72a and 72b and the lower mandrels 71a and 71b, respectively, form the steps 24a and 24b of the coaxial-resonator holes 2a and 2b, respectively, in the subsequent steps.

Figure 5:
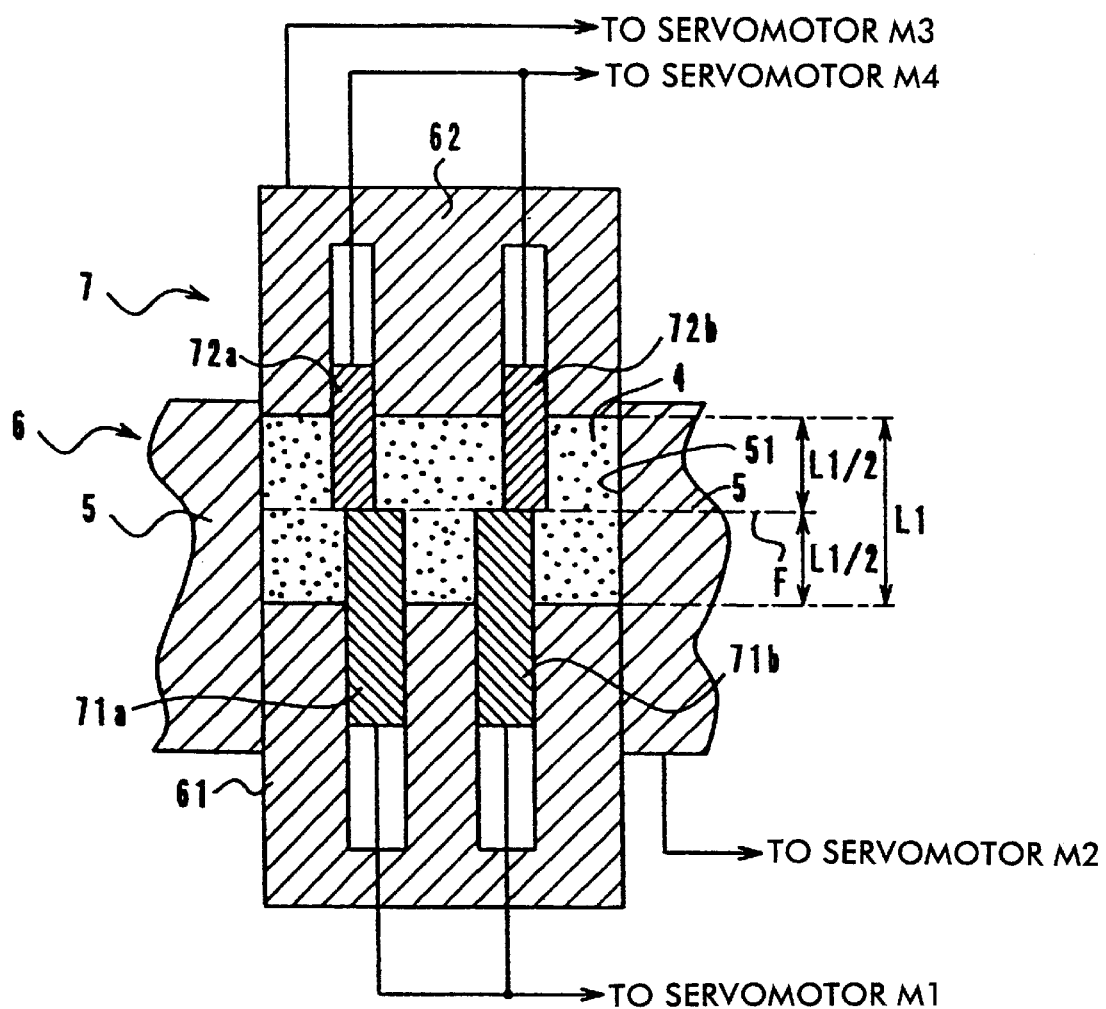
FIG. 5 is a schematic longitudinal-sectional view showing a step subsequent to that shown in FIG. 4.

While the upper and lower punches remain stationary, the upper mandrels 72a and 72b and the lower mandrels 71a and 71b slide downwardly toward the lower punch 61, as shown in FIG. 5. While this is happening, the respective lower faces and upper faces of the upper mandrels 72a and 72b and the lower mandrels 71a and 71b remain in contact with one another so as not to pressurize the powdered dielectric material 4 in the cavity 51. When the interface F between the upper mandrels 72a and 72b and the lower mandrels 71a and 71b reach a predetermined position in the cavity 51, the upper and lower mandrels 72a, 72b, 71a, and 71b stop their downward movement (a transfer step).

Thus, the powdered dielectric material 4 is distributed in the cavity 51 so as to form a shape of the dielectric block 1. In this case, the interface F between the upper mandrels 72a and 72b and the lower mandrels 71a and 71b are positioned at a distance L1/2 from the upper face of the lower punch 61 when the distance between the upper face of the lower punch 61 and the lower face of the upper punch 62 is set to a distance L1. The upper punch 62 is brought into contact with the powdered dielectric material 4.

Figure 6:
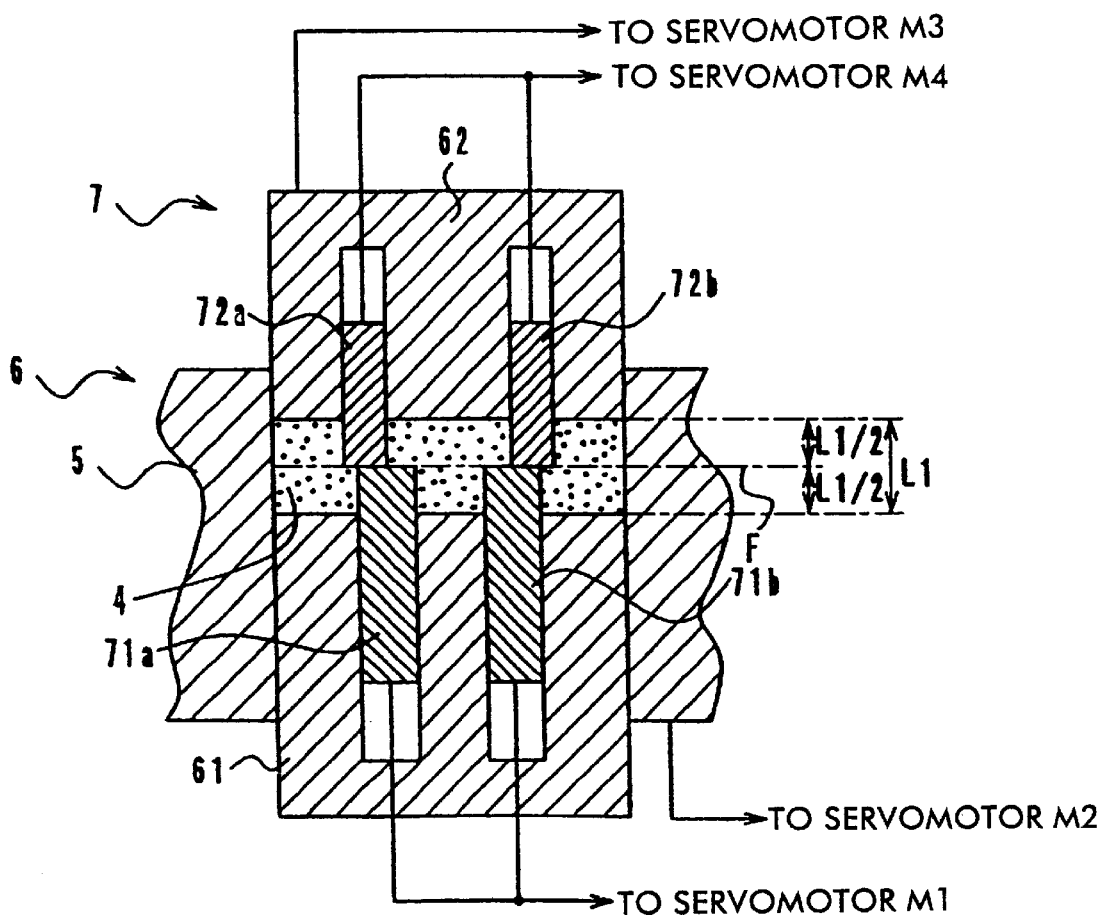
FIG. 6 is a schematic longitudinal-sectional view showing a step subsequent to that shown in FIG. 5.

As shown in FIG. 6, the die 5, the upper punch 62, the lower mandrels 71a and 71b, and the upper mandrels 72a and 72b move downward relative to the lower punch 61, and compress the powdered dielectric material 4, thereby forming the dielectric block 1 (a compressing step). The upper mandrels 72a and 72b and the lower mandrels 71a and 71b move downwardly together while maintaining the lower faces and the upper faces thereof, respectively, in contact with one another. The upper punch 62, the lower mandrels 71a and 71b, and the upper mandrels 72a and 72b descend by being driven by the servomotors M1, M3, and M4, respectively, so that the interface F between the upper mandrels 72a and 72b and the lower mandrels 71a and 71b, respectively, are positioned, at all times during the compressing step, at an intermediate point between the upper face of the lower punch 61 and the lower face of the upper punch 62. The die 5 also descends by being driven by the servomotor M2 in accordance with the descending motion of the lower mandrels 71a and 71b. Particularly, there is a linearly proportional relationship between the downward movement of die 5 and the downward movement of the lower mandrels 71a and 71b.

Figure 7:
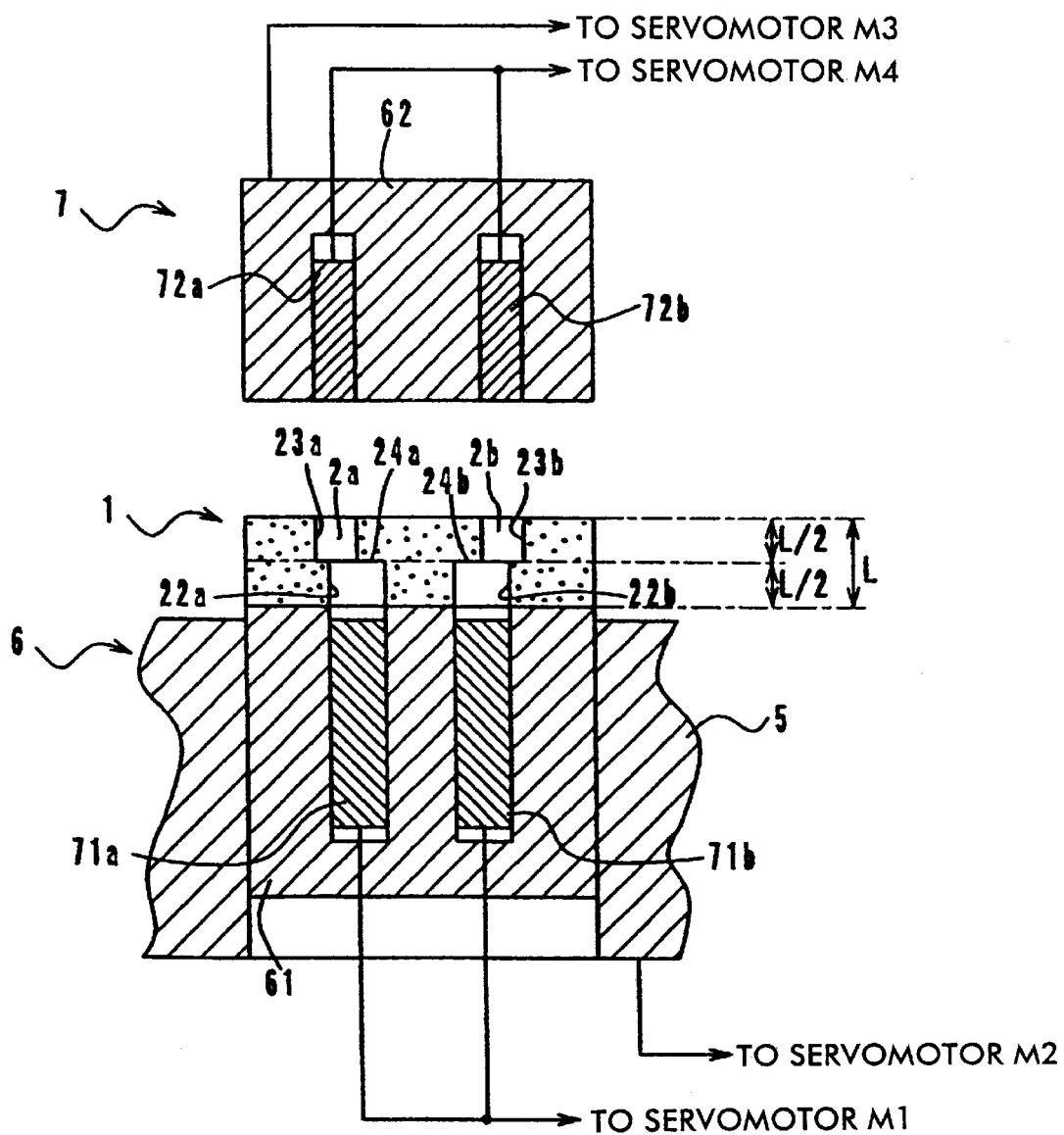
FIG. 7 is a schematic longitudinal-sectional view showing a step subsequent to that shown in FIG. 6.

As shown in FIG. 7, when the compressing step is completed, the die 5 and the lower mandrels 71a and 71b move downward, the upper punch 62 and the upper mandrels 72a and 72b move upward, and the molded dielectric block 1 is unloaded (a releasing step).

In the transfer step of the above method, the powdered dielectric material 4 in the cavity 51 is not significantly pressurized and is distributed in the cavity 51 so as to form a shape of the pressurized dielectric block 1 by the lower mold 6 and the upper mold 7. Then, the powdered dielectric material 4 in the cavity 51 is compressed, whereby the density of the powdered dielectric material 4 in the cavity 51 is substantially even. Therefore, the invention produces a dielectric block 1 in which cracks are not likely to be produced in the vicinity of the steps 24a and 24b of the coaxial-resonator holes 2a and 2b, respectively.

Since the positions of the upper mold 7 and the lower mold 6 are independently servo-controlled, the interface f between the upper mandrels 72a and 72b and the lower mandrels 71a and 71b is accurately controlled to be maintained halfway between the upper and lower molds, the pressure applied to the dielectric material in the cavity remains substantially even and the density of the powdered dielectric material 4 in the cavity 51 remains substantially even.

(Second Embodiment with Reference to FIGS. 8 to 14)

Figure 8:
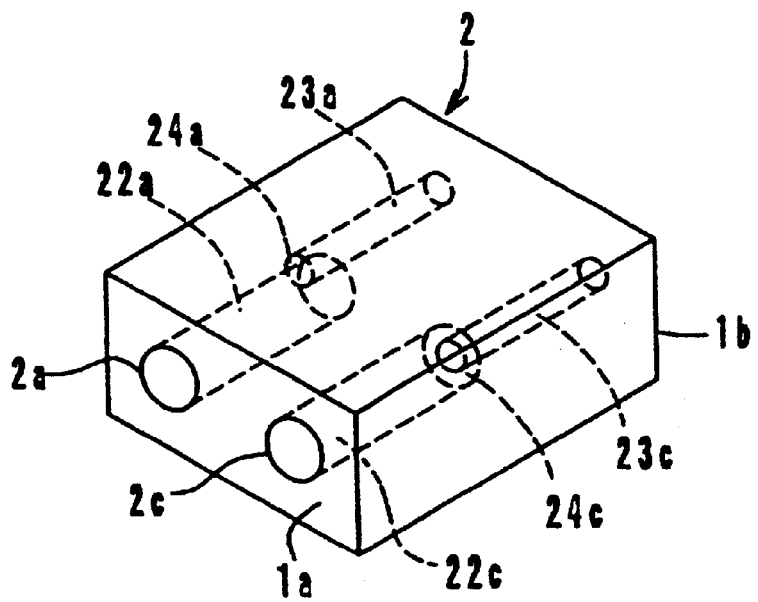
FIG. 8 is a perspective view of a dielectric block formed by a press-molding method according to a second embodiment of the present invention.
Figure 9:
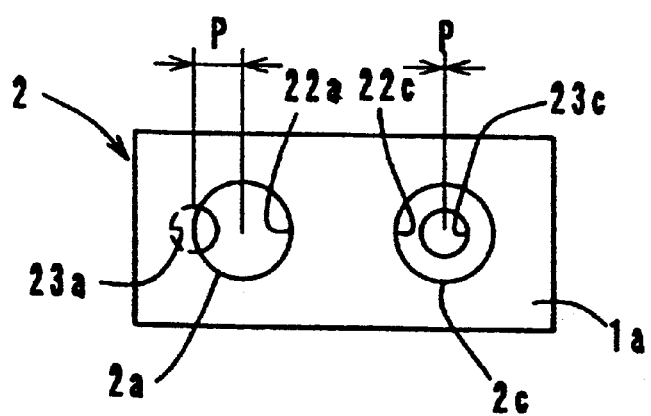
FIG. 9 is a front view of the dielectric block shown in FIG. 8.

FIG. 8 is a perspective view of a dielectric block formed by a press-molding method according to a second embodiment of the present invention. FIG. 9 is a front view of the dielectric block shown in FIG. 8. A dielectric block 2 shown in FIGS. 8 and 9 is used as a dielectric filter in the same way as the dielectric block 1 according to the first embodiment. The dielectric block 2 is provided with two coaxial-resonator holes 2a and 2c passing between opposite faces 1a and 1b of the dielectric block 2. The coaxial-resonator holes 2a and 2c include larger diameter portions 22a and 22c having circular sections, respectively, and smaller diameter portions 23a and 23c having circular sections, respectively. The axis of the smaller diameter portion 23a is eccentric to the larger diameter portion 22a. The axis of the smaller diameter portion 23c substantially coincides with the axis of the larger diameter portion 22c.

A press-molding apparatus for forming the above dielectric block 2 is described below. The same components as those used in the first embodiment are referred to with the same reference numerals, for which description is omitted.

Figure 10:
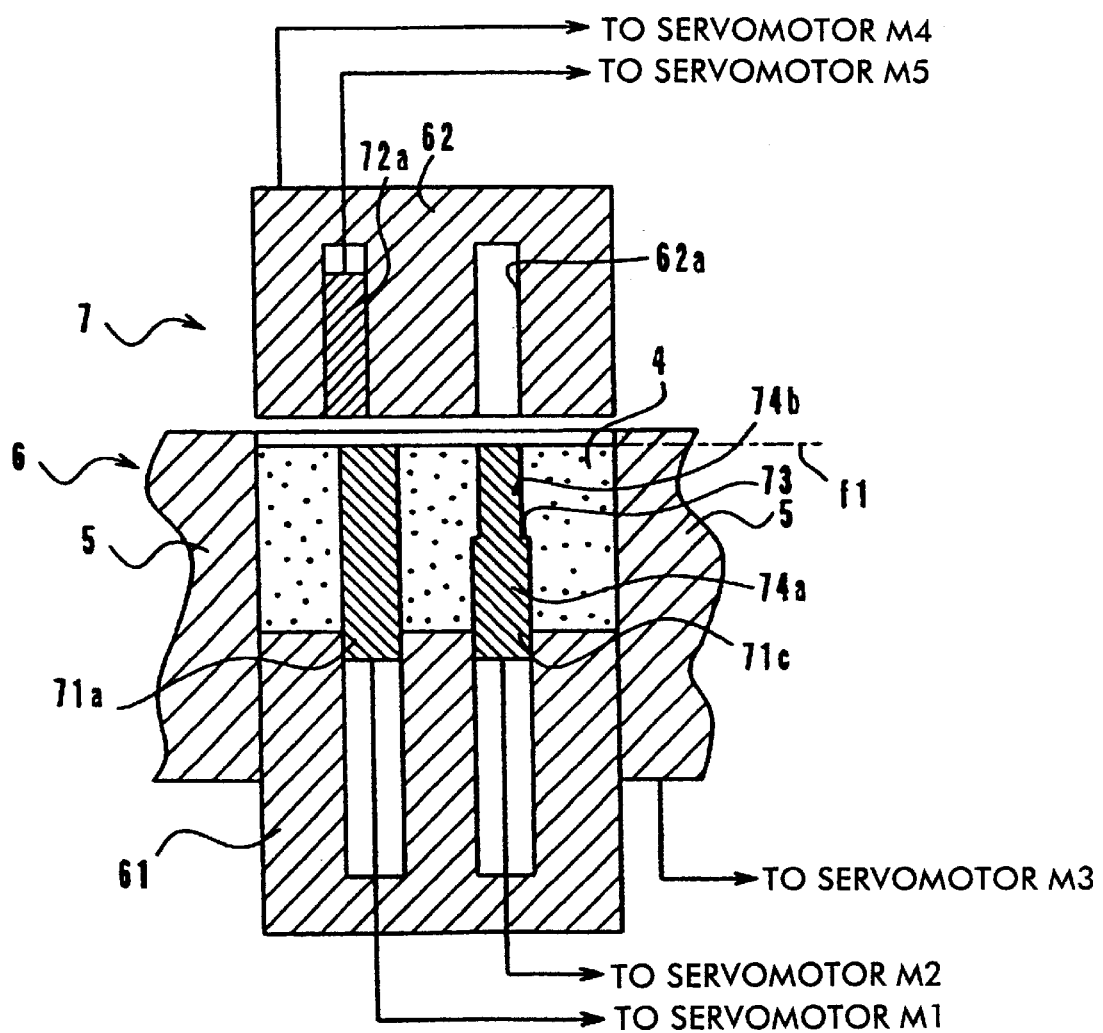
FIG. 10 is a schematic longitudinal-sectional view showing the method for press-molding the dielectric block shown in FIG. 8.

In FIG. 10, the press-molding apparatus is provided with a lower mold 6 and an upper mold 7. The lower mold 6 includes a die 5 and a lower punch 61 which is provided with lower mandrels 71a and 71c slidingly movable relative to the lower punch 61. The lower mandrel 71c includes a cylindrical portion 74a having a radius r1, and a cylindrical portion 74b coaxially connected with the cylindrical portion 74a at the upper end thereof and having a radius r2 smaller than the radius r1. That is, the lower mandrel 71c includes a part which forms the larger diameter portion 22c of the coaxial-resonator hole 2c and another part which forms the smaller diameter portion 23c of the coaxial-resonator hole 2c, the parts of the lower mandrel 71c being formed integrally with each other. A step 73 between the cylinders 74a and 74b forms the step 24c of the coaxial-resonator hole 2c. The upper mold 7 includes an upper punch 62 which is provided with an upper mandrel 72a slidingly movable relative to the upper punch 62 and a hole 62a into which the cylindrical portion 74b of the lower mandrel 71c is inserted (the cylindrical portion 74b being slidingly movable in the hole 62a).

In the coaxial-resonator holes 2a and 2c according to the second embodiment, the axes of the smaller diameter portions 23a and 23c may be eccentric to the larger diameter portions 22a and 22c, respectively, as long as expressions $0 \leq P \leq r1+r2$ and $0 \leq P \leq r1-r2$ are satisfied, respectively, in which r1 denotes the radius of each larger diameter portion 22a or 22c, r2 denotes the radius of each smaller diameter portion 23a or 23c, and P denotes the distance of offset between the axis of each larger diameter portion 22a or 22c and the axis of each smaller diameter portion 23a or 22c, respectively (see FIG. 9). The coaxial-resonator hole 2a has a shape in which a cross section of the smaller diameter portion 23a is disposed partly outside the cross section of the larger diameter portion 22a in cross-sectional view. The coaxial-resonator hole 2c has a shape in which a cross section of the smaller diameter portion 23c is disposed within the cross section of the larger diameter portion 22c in cross-sectional view.

The positions of the components of the lower mold 6 and the upper mold 7 are independently servo-controlled. AC servomotors M1, M2, M3, M4, and M5 vertically drive the lower mandrel 71a, the lower mandrel 71c, the die 5, the upper punch 62, and the upper mandrel 72a, respectively. The AC servomotors M1 to M5 are numerically controlled in accordance with positional information obtained by measuring the distances from the upper face of the lower punch 61 as a reference plane to the lower face of the upper punch 62, to the lower face of the upper mandrel 72a, to the upper faces of the lower mandrels 71a and 71c, and to the upper face of the die 5.

The method for press-molding the above-described dielectric block 2 is now described. As shown in FIG. 10, the lower mandrels 71a and 71c are raised to a level f1 and the press-molding apparatus is charged with a predetermined amount of a powdered dielectric material 4 (a charging step). According to the second embodiment, the powdered dielectric material 4 is charged into cavity 51 to substantially the same level as the level f1.

Figure 11:
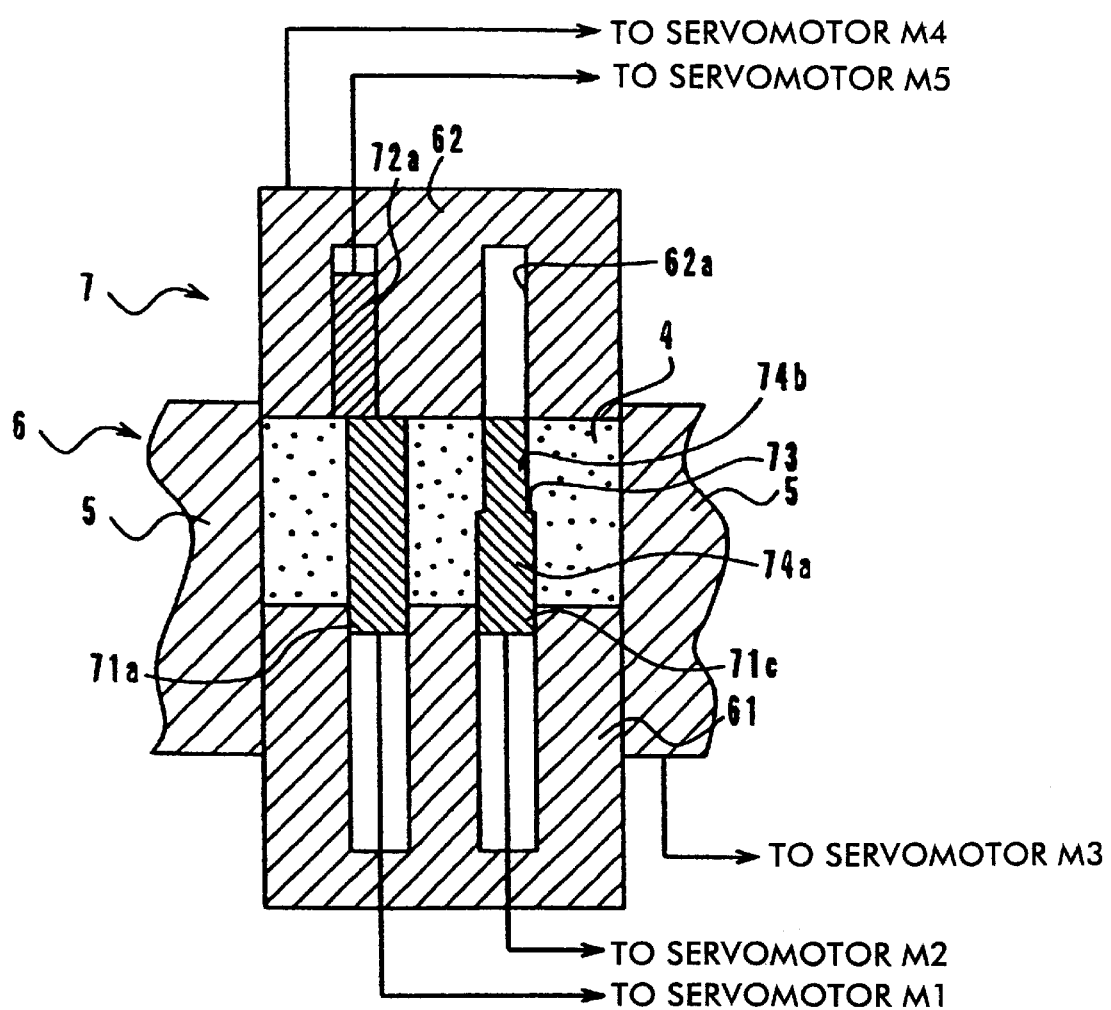
FIG. 11 is a schematic longitudinal-sectional view showing a step subsequent to that shown in FIG. 10.

The upper mold 7 descends until the lower faces of the respective upper punch 62 and the upper mandrel 72a come into contact with the upper face of the lower mandrel 71a at which point it stops descending, as shown in FIG. 11 (an approaching step). The interface at which the lower face of the upper mandrel 72a and the upper face of the lower mandrel 71a contact one another forms the step 24a of the coaxial-resonator hole 2a in the subsequent steps, in the same manner as in the first embodiment.

Figure 12:
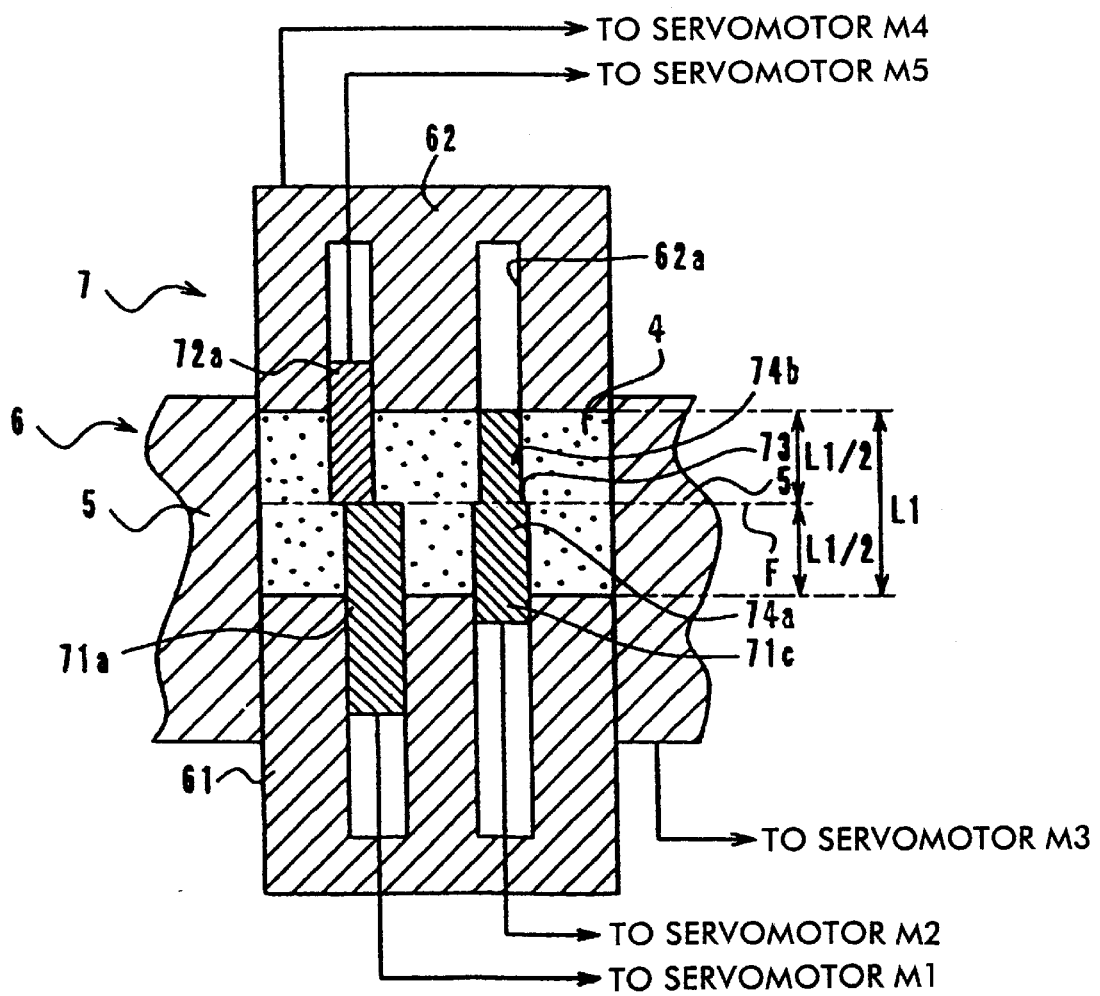
FIG. 12 is a schematic longitudinal-sectional view showing a step subsequent to that shown in FIG. 11.

The upper mandrel 72a and the lower mandrel 71a slide downwardly toward the lower punch 61 while their lower and upper faces, respectively, remain in contact with one another, as shown in FIG. 12, so as not to pressurize the powdered dielectric material 4 in the cavity 51. When the interface F between the upper mandrel 72a and the lower mandrel 71a reaches a predetermined position in the cavity 51, the upper and lower mandrels 72a and 71a stop their downward movement (a transfer step). Since the step 73 of the lower mandrel 71c has been set in the predetermined position in the cavity 51, according to the second embodiment, it is not necessary to move the lower mandrel 71c vertically during the transfer step.

Thus, the powdered dielectric material 4 is distributed in the cavity 51 so as to form a shape of the dielectric block 2. In this case, the interface F between the upper and lower mandrels 72a and 71a and the step 73 in the lower mandrel 71c are positioned at a distance L1/2 from the upper face of the lower punch 61 when the distance between the upper face of the lower punch 61 and the lower face of the upper punch 62 is set to a distance L1.

Figure 13:
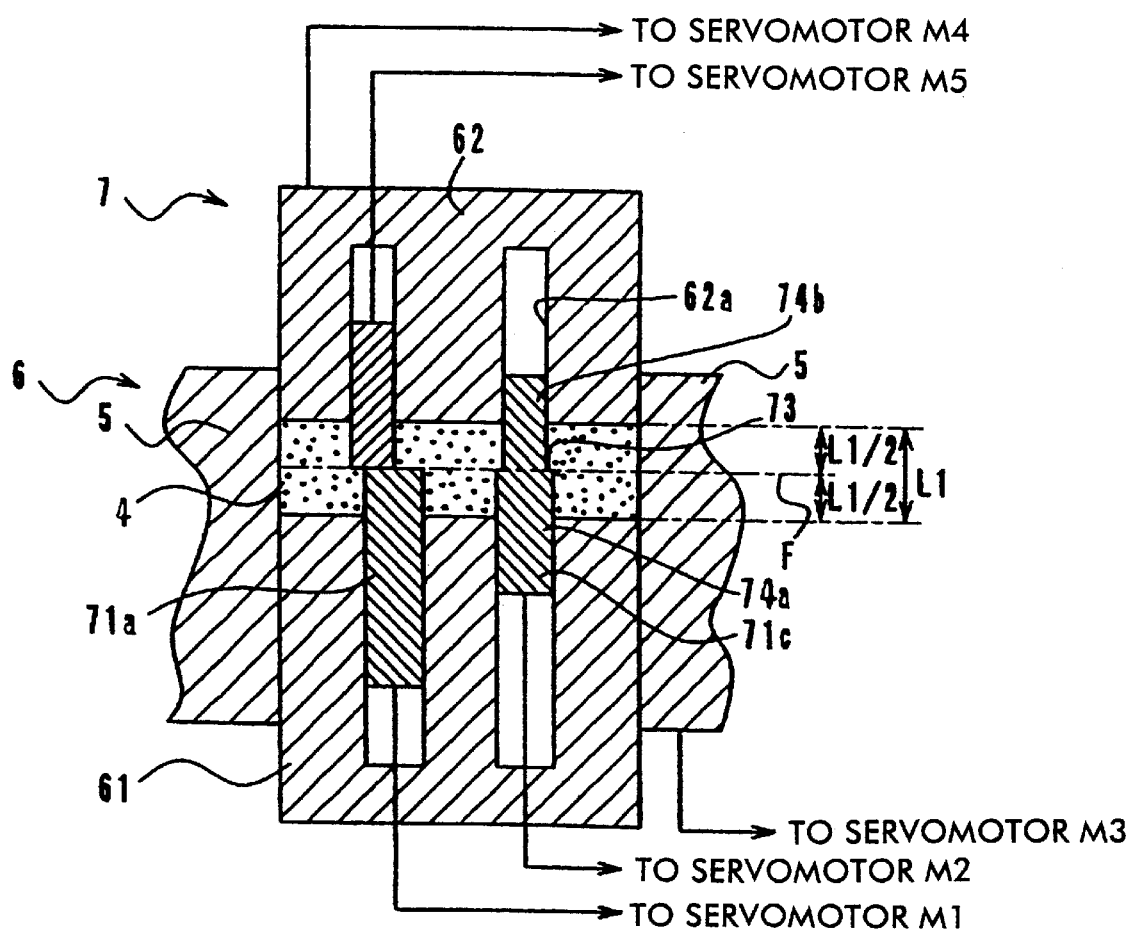
FIG. 13 is a schematic longitudinal-sectional view showing a step subsequent to that shown in FIG. 12.

In FIG. 13, the die 5, the upper punch 62, the lower mandrels 71a and 71c, and the upper mandrel 72a move downward relative to the lower punch 61, and compress the powdered dielectric material 4, thereby forming the dielectric block 2 (a compressing step). The upper mandrel 72a and the lower mandrel 71a move downwardly together such that the lower face and the upper face thereof remain in contact with one another at the interface F. The upper punch 62, the lower mandrels 71a and 71c, and the upper mandrel 72a descend by being driven by the servomotors M1, M2, M4, and M5, respectively, so that the interface F between the upper and lower mandrels 72a and the step 73 of the lower mandrel 71c are positioned, throughout the compressing step, at an intermediate point (halfway point) between the upper face of the lower punch 61 and the lower face of the upper punch 62.

Figure 14:
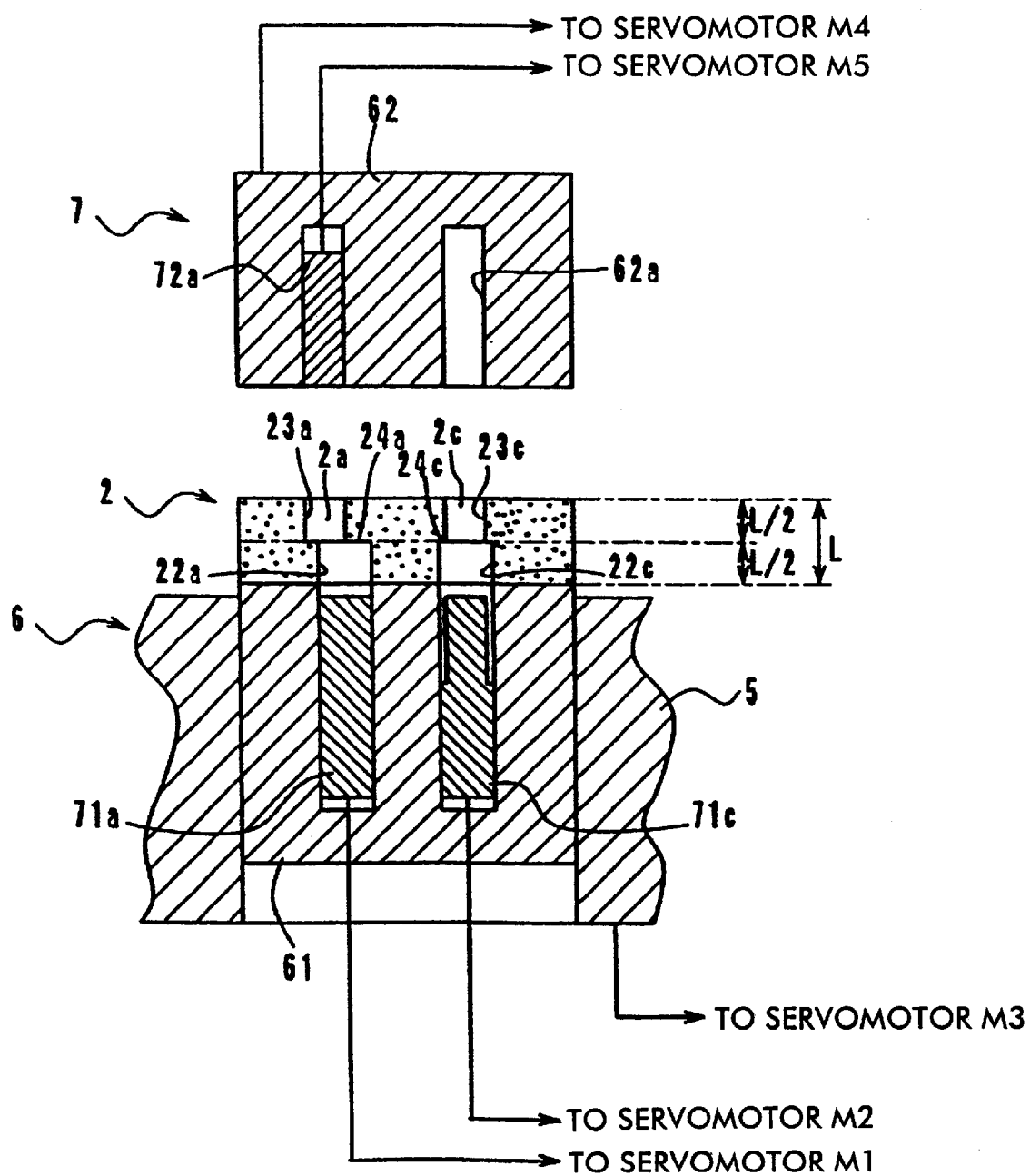
FIG. 14 is a schematic longitudinal-sectional view showing a step subsequent to that shown in FIG. 13.

As shown in FIG. 14, after the compressing step is completed, the die 5 and the lower mandrels 71a and 71c move downward, the upper punch 62 and the upper mandrel 72a move upward, and the molded dielectric block 2 is unloaded (a releasing step). The die 5 is driven downward by the servomotor M3 in accordance with the downward movement of the lower mandrels 71a and 71c. Particularly, there is a linearly proportional relationship between the downward movement of die 5 and the downward movement of the lower mandrels 71a and 71c.

The press-molding method according to the second embodiment offers the same operational effects as the press-molding method according to the first embodiment.

Figure 15:
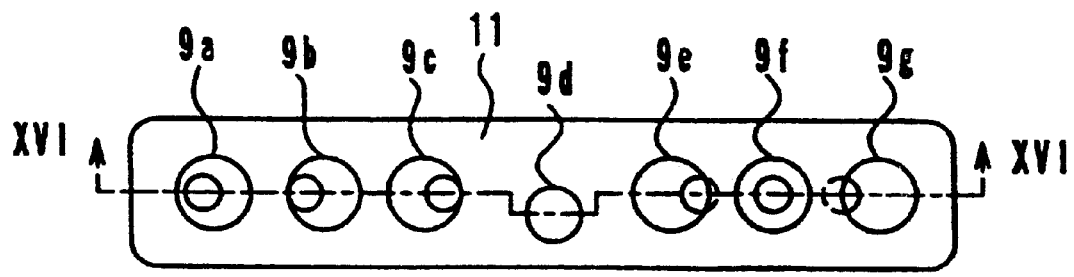
FIG. 15 is a front view of a dielectric block formed by a press-molding method according to another embodiment of the present invention.
Figure 16:
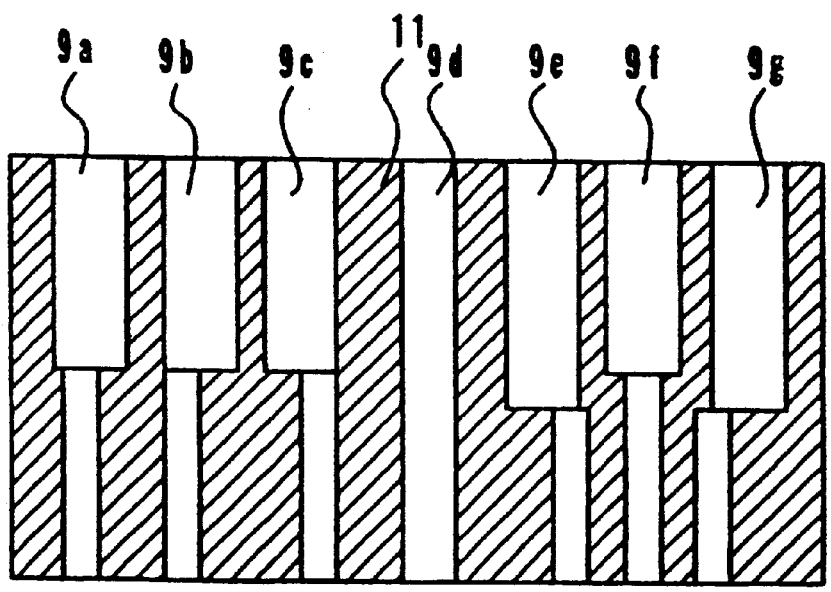
FIG. 16 is a sectional view along line XVI—XVI of the dielectric block shown in FIG. 15.
Figure 17:
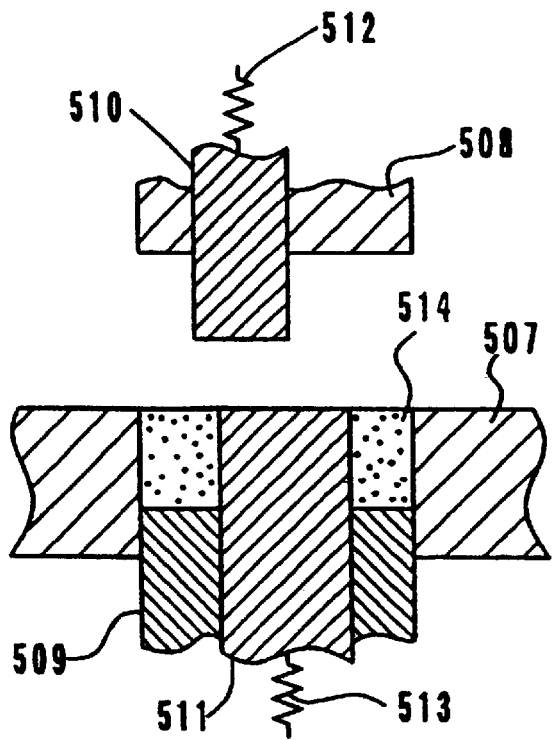
FIG. 17 is a schematic longitudinal-sectional view showing a known press-molding method.
Figure 18:
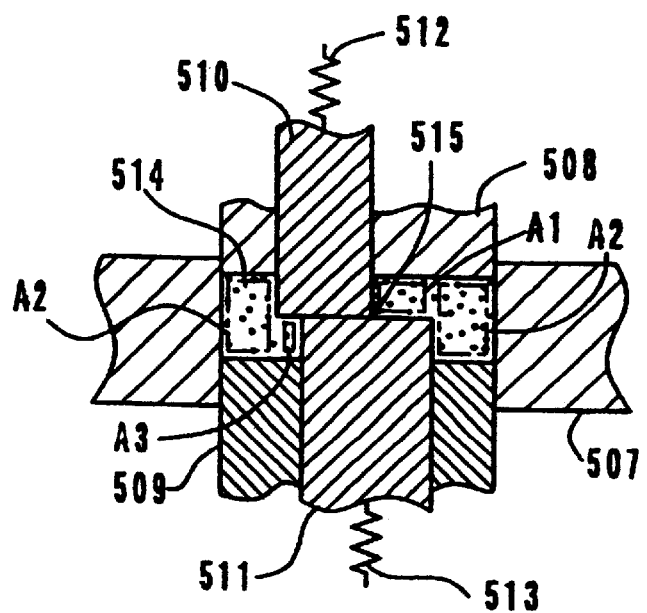
FIG. 18 is a schematic longitudinal-sectional view showing a step subsequent to that shown in FIG. 17.
Figure 19A:
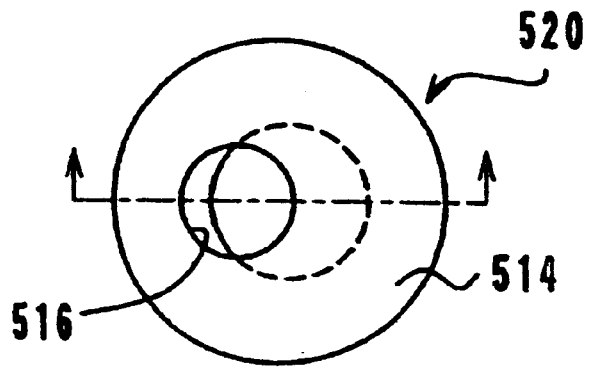
FIGS. 19A and 19B are a front view and a sectional view, respectively, of a dielectric block formed through the steps shown in FIGS. 17 and 18.
Figure 19B:
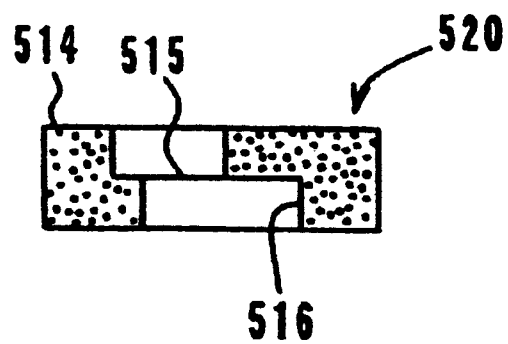

(Other Embodiments with Reference to FIGS. 15 and 16)

The present invention is not limited to the first and second embodiments, and various modifications within the spirit and scope of the present invention may be included. By way of example, and not limitation, several modifications will be discussed.

Although according to the first and second embodiments, the upper mold 7 stops moving between the approaching step and the transfer step, the approaching step may proceed to the transfer step without stopping the upper mold 7. Although the upper mandrels 72a and 72b and the lower mandrels 71a and 71b stop descending between the transfer step and the compressing step, the transfer step may proceed to the compressing step without stopping.

During the approaching step, the upper faces of the lower mandrels 71a and 71b may protrude from an upper surface of the powdered dielectric material 4 so that the upper mandrels 72a and 72b come into contact with the lower mandrels 71a and 71b, respectively, without the powdered dielectric material 4 therebetween.

According to the first embodiment, the powdered dielectric material 4 is compressed by the upper punch 62 and the upper and lower mandrels 72a, 71a, etc. descending toward the lower punch 61 while the lower punch 61 is fixed. Alternatively, the powdered dielectric material 4 may be compressed, for example, by an upward motion of the lower punch 61 and a downward motion of the upper punch 62 with the interface F being fixed at an intermediate position between the upper and lower punches 62 and 61.

Any number of the coaxial-resonator holes of any shape may be formed in the dielectric block. For example, the present invention may also be applied to a dielectric block 11 shown in FIGS. 15 and 16 which is used as a dielectric duplexer. FIG. 15 is a front view of the dielectric block 11. FIG. 16 is a sectional view along line XVI—XVI of the dielectric block 11 shown in FIG. 15. The dielectric block 11 is provided with seven coaxial-resonator holes 9a to 9g.

The axes of a larger diameter portion and a smaller diameter portion of each of the coaxial-resonator holes 9a to 9c, 9e, and 9g are offset from each other. A cross section of the smaller diameter portion is disposed partly outside the cross section of the larger diameter portion of each of the coaxial-resonator holes 9e and 9g. The larger diameter portion and the smaller diameter portion of each of the coaxial-resonator holes 9d and 9f are disposed coaxially. The larger diameter portion and the smaller diameter portion of the coaxial-resonator hole 9d have the same radii as each other.

The steps of the coaxial-resonator holes 9a to 9c, the steps of the coaxial-resonator holes 9e and 9g, and the step of the coaxial-resonator hole 9f are disposed at positions differing from each other in the axial direction. In this case, the interfaces between the lower and upper mandrels and steps of the lower mandrels are set to be positioned so that the ratios of the distances from the respective contact parts and the steps to the lower face of the upper punch and to the upper face of the lower punch are maintained unchanged during the compressing step.

Although cylindrical upper and lower mandrels are used in the first and second embodiments, the mandrels may have other sections such as rectangular or elliptical sections. When using rectangular-sectional upper and lower mandrels, holes having rectangular sections can be formed. Circular-sectional mandrels and rectangular-sectional mandrels may be used in combination. For example, a circular-sectional upper mandrel and a rectangular-sectional lower mandrel may be used in combination for forming a coaxial-resonator hole.

The relationship of radius between the larger diameter portion and the smaller diameter portion of the coaxial-resonator hole formed in the dielectric block is not limited to r1>r2, and it may be r1<r2 or r1=r2.

Although AC servomotors are preferably used for vertically moving the lower and upper mandrels and the like, any motor, cylinder, or the like which can control positioning at a predetermined accuracy may be used.

The direction of offset between the upper and lower mandrels is not limited to a horizontal direction, as shown in FIG. 15, and the offset may be in a vertical or oblique direction.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for press-molding a dielectric block using a press-molding apparatus for press-molding the dielectric block, which apparatus is provided with an upper mold including an upper punch provided with a slidingly movable upper mandrel, and a lower mold including a die having a cavity and a lower punch provided with a slidingly movable lower mandrel, the upper punch being slidingly movable in the cavity of the die and the lower punch being coupled in the cavity of the die, the method comprising:

charging a predetermined amount of a powdered dielectric material into the cavity when the lower mandrel protrudes from the lower punch into the cavity;

moving at least one of the upper mold and the lower mold so as to approach and come into contact with each other with a lower face of the upper mandrel and an upper face of the lower mandrel contacting each other at an interface between them;

moving the upper mandrel and the lower mandrel toward the lower punch while the upper mandrel and lower mandrel remain in contact with one another at the interface and transferring the interface to a predetermined position in the cavity charged with the powdered dielectric material; and compressing the powdered dielectric material in the cavity using relative movement between the upper punch and the lower punch while the upper mandrel and the lower mandrel remain in contact with each other at the interface, thereby forming the dielectric block.

2. A method for press-molding a dielectric block according to claim 1, wherein the position of components of the lower mold and the position of components of the upper mold are independently servo-controlled.

3. A method for press-molding a dielectric block according to claim 1, wherein the upper and lower mandrels are cylindrical in shape, $r1$ denotes the radius of the cylindrical lower mandrel, $r2$ denotes the radius of the cylindrical upper mandrel, and $P$ denotes the distance of offset between the axis of the lower mandrel and the axis of the upper mandrel, and the expression $0 \leq P \leq r1+r2$ is satisfied.

4. A method for press-molding a dielectric block according to claim 2, wherein the upper and lower mandrels are cylindrical in shape, $r1$ denotes the radius of the cylindrical lower mandrel, $r2$ denotes the radius of the cylindrical upper mandrel, and $P$ denotes the distance of offset between the axis of the lower mandrel and the axis of the upper mandrel, and the expression $0 \leq P \leq r1+r2$ is satisfied.

5. A method for press-molding a dielectric block according to claim 4, further including using the dielectric block as part of a dielectric filter or a dielectric duplexer.

6. A method for press-molding a dielectric block according to claim 1, further including using the dielectric block as part of a dielectric filter or a dielectric duplexer.

7. A method for press-molding a dielectric block according to claim 2, further including using the dielectric block as part of a dielectric filter or a dielectric duplexer.

8. A method for press-molding a dielectric block according to claim 3, further including using the dielectric block as part of a dielectric filter or a dielectric duplexer.

* * * * *